US012804079B2

(12) United States Patent
Lyu et al.

(10) Patent No.: US 12,804,079 B2
(45) Date of Patent: Nov. 17, 2026

(54) HIERARCHICAL DECOUPLING, INTEGRATED AND OPEN COMMUNICATION OPEN SYSTEM

(71) Applicant: CHINA UNICOM (GUANGDONG) INDUSTRIAL INTERNET CO., LTD., Guangzhou (CN)

(72) Inventors: Zhaobiao Lyu, Guangzhou (CN); Wenbo Zhao, Guangzhou (CN); Jianbo Liu, Guangzhou (CN); Guoxin Zhang, Guangzhou (CN); Chao Cheng, Guangzhou (CN); Junwu Li, Guangzhou (CN); Qing Xiao, Guangzhou (CN); Zhaojun Cui, Guangzhou (CN); Wentong Li, Guangdong (CN)

(73) Assignee: CHINA UNICOM (GUANGDONG) INDUSTRIAL INTERNET CO., LTD., Guangzhou (CN)

( * ) Notice: Subject to any disclaimer, the term of this patent is extended or adjusted under 35 U.S.C. 154(b) by 372 days.

(21) Appl. No.: 18/397,712

(22) Filed: Dec. 27, 2023

(65) Prior Publication Data

US 2024/0179246 A1 May 30, 2024

Related U.S. Application Data

(63) Continuation of application No. PCT/CN2023/080979, filed on Mar. 13, 2023.

(30) Foreign Application Priority Data

Nov. 29, 2022 (CN) ........................ 202211507835.7

(51) Int. Cl.
*H04L 12/66* (2006.01)
*H04M 3/00* (2024.01)
(Continued)

(52) U.S. Cl.
CPC ......... *H04M 7/123* (2013.01); *H04M 7/0093* (2013.01); *H04M 7/128* (2013.01)

(58) Field of Classification Search
CPC ............. H04M 3/5175; H04M 3/5183; H04M 3/5191; H04M 3/5166; H04M 3/5232;
(Continued)

(56) References Cited

U.S. PATENT DOCUMENTS 10,616,413 B1 * 4/2020 Vyas ................. H04M 3/42221
2014/0079207 A1 * 3/2014 Zhakov ............... H04M 3/5233
379/265.03
(Continued)

FOREIGN PATENT DOCUMENTS

CN 102387267 A 3/2012
CN 109274583 A * 1/2019 ............ H04L 51/00
(Continued)

OTHER PUBLICATIONS

English Translation of text of CN-109274583-A, Published 2026 (Year: 2026).*
(Continued)

*Primary Examiner* — Kharye Pope
(74) *Attorney, Agent, or Firm* — MUNCY, GEISSLER, OLDS & LOWE, P.C.

(57) ABSTRACT

A hierarchical decoupling, integrated and open communication open system includes a large communication network, a Yunxi platform, and a customer, which are communicatively connected to one another, wherein the Yunxi platform includes a service application layer, a communication capability layer and a resource pool, which are communicatively connected to one another, the large communication network, the communication capability layer and the customer are communicatively connected to one another, and the service application layer is communica-
(Continued)

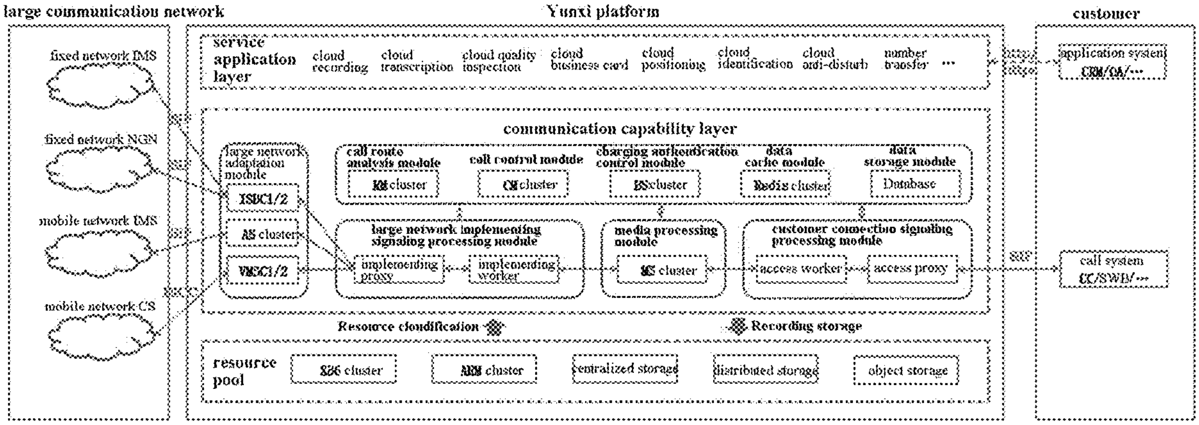

tively connected to the customer. The present invention innovates decentralized communication service provision methods, further integrate communication capabilities, encapsulate communication scenarios into flexible and easy-to-use communication modules, and provide a unified and convenient service interface, thereby lowering a user-side access threshold, and deeply integrating communication capabilities with application scenarios of government and enterprise customers.

9 Claims, 1 Drawing Sheet

(51) Int. Cl.
*H04M 5/00* (2006.01)
*H04M 7/00* (2006.01)
*H04M 7/12* (2006.01)

(58) Field of Classification Search
CPC .. H04M 3/5233; H04M 3/523; H04M 3/5237; H04M 2203/551; H04M 7/006; H04L 67/10; H04L 51/02; H04L 67/306; H04L 67/02; H04L 65/1069; H04L 65/1104; H04L 67/53; H04L 51/214; H04L 51/046; H04L 67/141; H04L 65/401; H04L 67/14; H04L 65/80; H04L 67/1001; H04W 4/14; H04W 24/02; H04W 4/24; H04W 28/0268; H04W 28/24; H04W 4/50; H04W 4/16; H04W 88/085; H04W 12/06; H04W 48/12; H04W 8/02
See application file for complete search history.

(56) References Cited

U.S. PATENT DOCUMENTS

2014/0140494 A1* 5/2014 Zhakov ............... H04M 3/5183 379/265.03
2015/0063166 A1* 3/2015 Sif .......................... H04L 41/40 455/418
2016/0036981 A1* 2/2016 Hollenberg ......... H04M 3/5233 379/265.12
2019/0245714 A1* 8/2019 Ansari ............. G08B 13/19656
2020/0252440 A1* 8/2020 El-Gawady ......... H04L 65/1059
2022/0329995 A1* 10/2022 Venkata .................. H04W 4/50
2022/0345374 A1* 10/2022 Venkata .................. H04L 41/50

FOREIGN PATENT DOCUMENTS

CN 109981544 A 7/2019
CN 111436028 A 7/2020
CN 115550321 A 12/2022
WO 2013075492 A1 5/2013

OTHER PUBLICATIONS

International Search Report dated Jul. 11, 2023, in International Application No. PCT/CN2023/080979.
First Examination Report dated Jan. 10, 2023, in Chinese Application No. 202211507835.7.

* cited by examiner

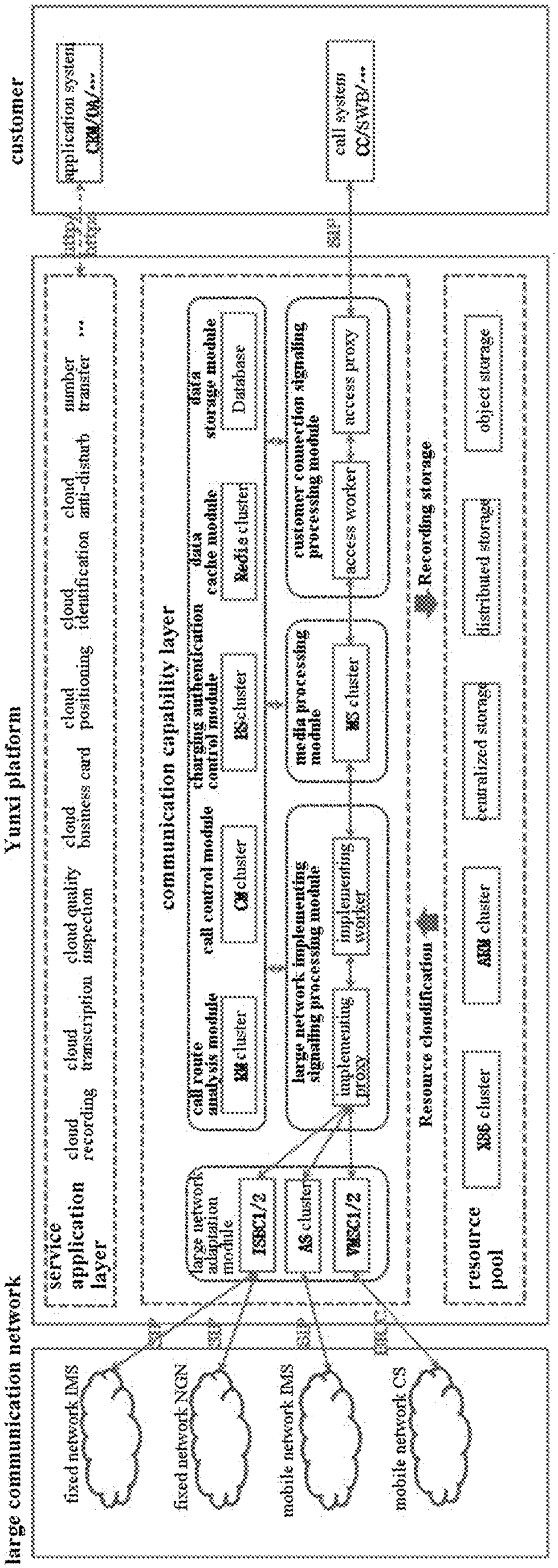
customer
application system
call system
CC/SWB/...
Yunxi platform
service application layer
cloud recording
cloud transcription
cloud quality inspection
cloud business card
cloud positioning
cloud identification
cloud anti-disturb
number transfer
...
communication capability layer
large network adaptation module
ISBC1/2
AS cluster
call route analysis module
call control module
charging authentication control module
data cache module
Redis cluster
data storage module
Database
large network implementing signaling processing module
implementing proxy
implementing worker
media processing module
customer connection signaling processing module
access worker
access proxy
Resource cloudification
Recording storage
resource pool
cluster
centralized storage
distributed storage
object storage
large communication network
fixed network IMS
fixed network NGN
mobile network IMS
mobile network CS

HIERARCHICAL DECOUPLING, INTEGRATED AND OPEN COMMUNICATION OPEN SYSTEM

CROSS REFERENCE TO RELATED APPLICATIONS

The present application is a continuation of International Application No. PCT/CN2023/080979, filed on Mar. 13, 2023, which claims priority from Chinese Patent Application No. 202211507835.7 filed on Nov. 29, 2022, all of which are hereby incorporated herein by reference.

TECHNICAL FIELD

The present invention relates to the field of telecommunication technology, in particular to a hierarchical decoupling, integrated and open communication open system.

BACKGROUND

A communication network architecture in the related art has low construction efficiency, high maintenance costs, and difficult operation and maintenance. Moreover, communication technology solutions for government and enterprise customers have single function, and a communication access technology mainly has following shortcomings.

1) Low Access Efficiency

For an enterprise customer, it needs to apply for a number resource and a line resource from operators in various regions respectively when accessing an operator communication network, and services cannot be activated nationwide at the same time. Limited by the process complexity of the operators in various regions, approval procedures for the enterprise customer to activate communication services in all of the regions are cumbersome and inefficient.

2) High Maintenance Costs

For an enterprise customer, communication equipment needs to be configured in various cities and accessed to an operator communication network to form networking within the enterprise. In order to ensure that enterprise communication services are available, the enterprise needs to deploy professional communication support personnel in the various cities to provide localized maintenance support, and labor costs of professional communication operation and maintenance remain high.

3) Long Access Cycle and Difficult Capacity Expansion

For an enterprise customer and an operator, in the related art, the customer is accessed to a communication network through an E1 trunk circuit, equipment construction and line connection construction are required for an operator network and a customer system, and an access cycle is generally two to three months. At the same time, when needs for services increase and resource expansion is required, the operator needs to upgrade hardware and expand line capacity in an operator computer room. The data configuration is complex and an iteration cycle is long, and it is impossible to periodically and dynamically allocate resources for the customer according to service peaks of the customer, which greatly affects the service development of the customer.

4) Simple Communication Service Content

For an operator, current customer communication access solutions can only provide customers with “dumb pipes”, cannot provide customers with rich value-added applications, and cannot enhance the value of an operator communication network.

5) Failure to Effectively Control Communication Security

For an operator, current customer communication access solutions still have potential risks in information security. User call behaviors cannot be controlled, service content is difficult to control, source tracing is difficult when complaints arise, and there are potential risks in the information security.

SUMMARY

It is therefore an object of the present invention to provide a hierarchical decoupling, integrated and open communication open system, which innovates decentralized communication service provision ways, further integrates communication capabilities, encapsulates communication scenarios into flexible and easy-to-use communication modules, and opens a unified and convenient service interface, thereby lowering an user-side access threshold, and allowing deeply integrated communication capabilities with application scenarios of government and enterprise customers.

According to the preset invention, the hierarchical decoupling, integrated and open communication open system includes a large communication network, a Yunxi platform, and a customer, which are communicatively connected to one another.

In the present invention the Yunxi platform includes a service application layer, a communication capability layer and a resource pool, which are communicatively connected to one another.

In such system, the large communication network, the communication capability layer and the customer are communicatively connected to one another, and the service application layer is communicatively connected to the customer.

According to the hierarchical decoupling, integrated and open voice communication architecture system in the present invention, common needs of government and enterprise customers in diverse communication scenarios are extracted, an IT technology is introduced into a communication network through the idea of network segmentation, communication capability underlying hardware equipment is reconstructed through cloudification, the original tree-type underlying communication network is thus connected each other, and distributed communication resources are thus converged. By making communication capabilities cloud-based and software-based, modules are decoupled from one another and support scaling, the communication stability and the information security are improved. Therefore, a low-threshold communication capability application programming interface (API) or software development kit (SDK) is open to the outside world, and rich scenario-based communication applications are provided and perfectly integrated into customer service systems. Specifically, general-purpose computing hardware such as x86 and ARM and a virtualization technology are used to carry the functions of network equipment in the related art, replace the private, dedicated and closed hardware equipment in the communication network, redefine and construct CT networks, and build a unified and general-purpose hardware platform and service logic open architecture. With software and hardware decoupling and abstraction of a CT network function, a control plane and a data plane of CT network equipment are separated. Therefore, solutions in the related art that are based on dedicated hardware equipment are transformed into more open software-based solutions, so that the CT network function does not depend on the dedicated hardware equipment, giving network resources flexibility and openness while taking into account security. Software is used to replace dedicated NAT, load balancing, session border controller, DNS, firewall and other hardware equipment to provide the same virtual network functions. The sub-functions described above are combined into a virtual router that can handle complex communication services, which can be quickly implemented and applied on a general-purpose hardware server, and can perform automatic deployment, scaling, fault isolation and self-healing according to actual service needs.

According to a preferably embodiment, the communication capability layer includes a large network adaptation module, a call route analysis module, a call control module, a charging authentication control module, a data cache module, a data storage module, a large network implementing signaling processing module, a media processing module and a customer connection signaling processing module.

In this case, the large network adaptation module is communicatively connected to the large network implementing signaling processing module.

The call route analysis module, the call control module, the charging authentication control module, the data cache module and the data storage module are communicatively connected to one another.

The large network implementing signaling processing module, the media processing module, and the customer connection signaling processing module are communicatively connected to one another.

The call route analysis module, the call control module, the charging authentication control module, the data cache module, and the data storage module are each communicatively connected to the large network implementing signaling processing module, the media processing module and the customer connection signaling processing module.

In the present invention, the communication capability layer can implement communication processing modules in the cloud, and functional modules are decoupled from one another and deployed in clusters. The customer and the large communication network are accessed through a proxy-worker architecture. The large network adaptation module matches different data specifications of more than three hundred local networks nationwide and provides the customer with a unified access interface.

Moreover, the service application layer further includes functions of cloud recording, cloud transcription, cloud quality inspection, cloud business card, cloud positioning, cloud identification, cloud anti-disturb and/or number transfer.

The service application layer decouples communication control and communication processing, and derives diversified service capabilities based on a voice communication capability, including recording, positioning, anti-disturb, number conversion, and the like. The service application layer provides access to the customer through a low-threshold application programming interface (API) or a software development kit (SDK), and deeply embeds the communication control capability into a customer service system.

The large communication network module in the present invention further includes a fixed network IP multimedia subsystem, a fixed network NGN, a mobile network IP multimedia subsystem and a mobile network CS.

The fixed network IP multimedia subsystem and the fixed network NGN are each communicatively connected to an ISBC.

The mobile network IP multimedia subsystem is communicatively connected to an AS cluster.

The mobile network CS is communicatively connected to a VMSC.

Particularly, the large network adaptation module includes an ISBC, an AS cluster and/or a VMSC.

The ISBC, the AS cluster and the VMSC are each communicatively connected to the large network implementing signaling processing module.

The large network adaptation module includes a session border controller (SBC) of a fixed communication network processing unit, a mobile communication network internet protocol multimedia subsystem (IMS), a domain processing unit AS, a mobile communication network server-client (CS), and a domain processing unit VMSC, and is used to implement a communication request initiated by the customer to different communication networks to ensure compliant transmission of traffic.

More particularly, the resource pool includes an X86 cluster, an ARM cluster, a centralized storage, a distributed storage and/or an object storage.

Hardware resource pools in the present invention are unified and managed, and an operation and maintenance monitoring platform is used to manage an x86 server cluster, an ARM server cluster, the centralized storage, the distributed storage and the object storage in the cloud, thereby monitoring resource usage and operation in real time, and providing hardware guarantee and cloud computing resources for the stable operation of the communication capability layer.

The customer in the present invention may further include an application system and a call system.

The application system is communicatively connected to the service application layer.

The call system is communicatively connected to the customer connection signaling processing module.

The customer connection signaling processing module adopts a proxy-worker distributed cluster soft-switching technology, and is used to process and forward customer-side call signaling, negotiate with the customer call system to establish a call channel, and respond to operation requests from control modules.

In the present invention, the large network adaptation module may further include a session border controller (SBC), an AS cluster and/or a VMSC.

The session border controller (SBC), the AS cluster and the VMSC are each communicatively connected to the large network implementing signaling processing module.

The large network implementing signaling processing module includes an implementing proxy and an implementing worker.

The implementing proxy is communicatively connected to the implementing worker.

The ISBC, the AS cluster, and the VMSC are each communicatively connected to the implementing proxy.

The customer connection signaling processing module further includes an access proxy and an access worker.

The access proxy is communicatively connected to the call system (CC) or a switchboard (SWB).

A fixed communication network and a mobile communication network integrate the common proxy-worker distributed cluster soft-switching technology. A proxy cluster uses simple and efficient a signaling agent to forward and load-share traffic, and is responsible for externally connecting to a large network implementing network or a customer application system, and internally scheduling and managing the worker cluster. The proxy controls account-level and application-level black and white lists and CAPS to effectively ensure platform and large network security. The worker cluster is responsible for complex service logic processing, implementing functions of number registration, relay routing, call control, media resource scheduling and media grouping cluster management, and configuring communication resources with attributes and calls the communication resources in scenarios for customer applications. The worker cluster can horizontally expand signaling plane and media plane resources, and automatically isolate resources and degrade services within seconds when individual module faults occur.

The communication connection between the communication capability layer and the resource pool is achieved in a way that the resource pool is implemented in the communication capability layer through resource cloudification, and the communication capability layer is stored in the resource pool through recording.

Compared with the related art, the present invention can obtain some beneficial effects.

The hierarchical decoupling, integrated and open voice communication architecture system according to the present invention reconstructs network services in the related art running on dedicated hardware. An underlying communication technology framework is reconstructed in the cloud based on the idea of network segmentation, a tree communication network in the related art is connected, and communication resources nationwide are converged. By building a standardized internet protocol multimedia subsystem (IMS) flat network architecture, the communication integration of a fixed communication network and a mobile communication network can be realized, and the correlation problem between fixed office and mobile office scenarios of a customer is solved. Communication resources are elastically expanded according to actual service load of a user, and communication resource utilization is improved. Services can be accessed and activated at one point without the need to build physical trunks, which greatly improves the implementation efficiency of communication technology solutions and saves the high cost of dedicated network hardware, thus reducing maintenance costs and the number of faults. By encapsulating communication capabilities into fine-grained communication modules, new network services and applications can be launched on demand without the need for dedicated hardware equipment, and modules are decoupled from one another, scalable and grayscale upgraded, which improves the stability, availability and scalability of the platform. A low-threshold communication application programming interface (API) or software development kit (SDK) service is open to the outside world and is perfectly integrated into customer service systems to meet complex communication needs of government and enterprise customers.

BRIEF DESCRIPTION OF THE DRAWINGS

The solo FIGURE shows a platform architecture diagram of a hierarchical decoupling, integrated and open communication open system according to an embodiment of the present invention.

DETAILED DESCRIPTION

The technical solution in the embodiments of the present invention will be clearly and completely described below with reference to the accompanying drawings in the embodiments of the present invention. Obviously, the described embodiments are merely some, not all, of the embodiments in the present invention. Based on the embodiments in the present invention, all other embodiments obtained by those skilled in the art fall within the protection scope of the present invention.

The solo FIGURE shows a hierarchical decoupling, integrated and open communication open system according to an embodiment of the present invention, including: a large communication network; a Yunxi platform; and a customer, which are communicatively connected to one another.

In the present embodiment, the Yunxi platform includes a service application layer, a communication capability layer, and a resource pool, which are communicatively connected to one another, In this situation, the large communication network, the communication capability layer and the customer are communicatively connected to one another, and the service application layer is communicatively connected to the customer.

The present embodiment of the present invention includes a cloud-based, software-based fixed communication network and mobile communication network voice communication platform architecture, in which the underlying is adapted to the large communication network, distributed communication resources are converged, and the underlying communication resources and common capabilities of application scenarios are encapsulated, a cloud computing technology is combined to decouple a communication module from a functional module and reconstruct the communication module and the functional module by cloudification, and the present invention thus provides an open communication capability application programming interface (API) or a software development kit (SDK) to the outside world.

According to the present embodiment, the communication capability layer includes a large network adaptation module, a call route analysis module, a call control module, a charging authentication control module, a data cache module, a data storage module, a large network implementing signaling processing module, a media processing module and a customer connection signaling processing module.

In this situation, the large network adaptation module is communicatively connected to the large network implementing signaling processing module.

The call route analysis module, the call control module, the charging authentication control module, the data cache module and the data storage module are communicatively connected to one another.

The large network implementing signaling processing module, the media processing module, and the customer connection signaling processing module are communicatively connected to one another.

The call route analysis module, the call control module, the charging authentication control module, the data cache module and the data storage module are each communicatively connected to the large network implementing signaling processing module, the media processing module and the customer connection signaling processing module.

Specifically, the call route analysis module is configured to automatically put a call into a call queue for waiting, and then allocate an optimal call path to the call based on established call rules and call relations.

The call control module is used to establish, maintain and clear a call, and complete an operation request from the service application layer by controlling the signaling processing module and the media processing module.

The charging authentication control module is configured for charging authentication of an access request from a user, determining a payment subscription status of the user, and authorizing a communication resource operation request.

The data cache and data storage module is configured for distributed data cache and data persistence under a micro-service architecture, improving throughput of read operation to cope with high concurrent query requests, while ensuring the consistency of cache and database data.

The media processing module is configured for voice acquisition, data packet transmission and reception, voice encoding and decoding, jitter processing, and the like, and for responding to a control request from the signaling processing module, and decoupling signaling and a media service.

The service application layer in the present embodiment particularly includes functions of cloud recording, cloud transcription, cloud quality inspection, cloud business card, cloud positioning, cloud identification, cloud anti-disturb and/or number transfer.

Specifically, the service application layer uses a low-code application programming interface (API) open module to provide a low-code lightweight communication API service to a user, and adopts a pluggable concept to build a loosely coupled plug-in architecture to adapt to flexible and customized development or calling needs. Functions will evolve synchronously with a customer service system while an external interface remains unchanged. In a design stage of API, the pluggable design concept is adopted to build a loosely coupled plug-in architecture and separate extended functions from the overall product design framework. Each plug-in only completes a specific function, and a complex functional service thus is formed through the combination of different plug-ins, thereby reducing the complexity and maintenance difficulty of the framework and adapting to flexible and customized development or calling needs. Specifically, during a test stage of the API, different application programming interface workspaces are preset, different access addresses are assigned to API in the workspaces and a gateway, and the API under test and running is logically isolated to ensure that the data during test does not contaminate the running data. In a management stage of the API, by introducing the concept of API portal, the communication capability API is shared and opened as an IT resource, and resources are isolated and managed at the smallest granularity through an independent tenant model. In a release stage of the API, interactive API documents are used to conduct call evaluation and functional evaluation of the API, so that a set of interface documents can adapt to hundreds of different scenarios and reduce use costs for a consumer of the API.

In the present embodiment, the large communication network module particularly includes a fixed network IP multimedia subsystem, a fixed network NGN, a mobile network IP multimedia subsystem and a mobile network CS.

In this situation, the fixed network IP multimedia subsystem and the fixed network NGN are each communicatively connected to an ISBC.

The mobile network IP multimedia subsystem is communicatively connected to an AS cluster.

The mobile network CS is communicatively connected to a VMSC.

The resource pool particularly includes an X86 cluster, an ARM cluster, a centralized storage, a distributed storage and/or an object storage.

Specifically, the resource pool provides safe and stable data persistence support to a container according to different scenarios.

The customer particularly includes an application system and a call system.

In this situation, the application system is communicatively connected to the service application layer.

The call system is communicatively connected to the customer connection signaling processing module.

In the present embodiment, the large network adaptation module particularly includes an Interconnect Session Border Controller (ISBC), an Application Server (AS) cluster and/or a Visited Mobile Switching Centre (VMSC).

In this situation, the ISBC, the AS cluster and the VMSC are each communicatively connected to the large network implementing signaling processing module.

Specifically, the fixed communication network Internet protocol (IP) multimedia subsystem, the fixed communication network next generation network (NGN) are communicatively connected to the session border controller (SBC) through a session initiation protocol (SIP), the mobile communication network internet protocol multimedia subsystem (IMS) is communicatively connected to the AS cluster through the session initiation protocol (SIP), and the mobile communication network server-client (CS) is communicatively connected to the VMSC through a bearer independent call control protocol (BICC).

The application system is communicatively connected to the service application layer through http or https communication.

According to the present invention, the large network implementing signaling processing module includes an implementing proxy and an implementing worker.

In this situation, the implementing proxy is communicatively connected to the implementing worker.

The ISBC, the AS cluster, and the VMSC are each communicatively connected to the implementing proxy.

Specifically, the large network implementing signaling processing module adopts a proxy-worker distributed cluster soft-switching technology, and is used to process and forward large network-side call signaling, negotiate with the large network adaptation module to establish a call channel, and respond to operation requests from control modules.

The customer connection signaling processing module particularly includes an access proxy and an access worker.

The access proxy is communicatively connected to the call system (CC) or a switchboard (SWB).

Specifically, the access proxy is communicatively connected to the call system (CC) or a switchboard (SWB) through the session initiation protocol (SIP).

In the present embodiment, the communication connection between the communication capability layer and the resource pool is achieved in a way that the resource pool is implemented in the communication capability layer through resource cloudification and the communication capability layer is stored in the resource pool through recording.

The resource pool is responsible for the scheduling and allocation of computing resources on different cloud pools and different architectures, which adapts to ARM server architectures, and thus provides safe and reliable communication connections.

A specific voice communication processing flow based on the hierarchical decoupling, integrated and open communication open system mentioned above is further provided.

According to the voice communication processing flow, before a call is established, the customer-side call system accesses the customer connection signaling processing module of the platform through the SIP protocol, and initiates a call INVITE request to the access proxy of the platform.

The access proxy of the platform then sends the call request to the access worker cluster for processing.

The access worker sends the processed call request to the large network implementing signaling processing module, the implementing worker cluster transfers the processed call request to the implementing proxy, and after further processing by the implementing proxy, the call request is sent to the large network adaptation module.

The session border controller (SBC), the AS cluster, and the VMSC of the large network adaptation module are respectively responsible for guiding and unblocking service calls of the fixed communication network, domain service calls of the mobile communication internet protocol multimedia subsystem (IMS), and domain service calls of the mobile communication server-client (CS).

After the call connection is established through negotiation, the media stream data of both parties in the call is processed and forwarded through an MS cluster of the media processing module.

When the call ends, the party that hangs up initiates an end call request. After the end call request is negotiated by the large network implementing signaling processing module and the customer connection signaling processing module, a call media stream channel is closed and relevant communication resources are released.

During the call process, a plurality of different modules are responsible for the control, authentication and routing of the call to ensure the stability and security of the call. The charging authentication control module is responsible for authenticating the access permission of a customer call system. The call route analysis module is responsible for selecting an optimal communication connection path based on the current communication line operating status. The call control module is responsible for controlling the calling behavior of both parties and preventing spam call harassment behavior in time. The data cache and storage module is responsible for real-time processing of call data and provides metadata for upper-layer service applications.

An independent service application layer is formed above the communication capability layer, common needs of government and enterprise customers in diverse communication scenarios are extracted, encapsulated into cloud recording, cloud transcription, cloud quality inspection, cloud business card, cloud positioning, cloud identification, cloud anti-disturb, number conversion and other communication capability application programming interfaces (API) or software development kits (SDK), and are integrated or converged into customer service systems to meet complex communication needs.

Obviously, the above-mentioned embodiments of the present invention are only examples for clearly illustrating the technical solutions of the present invention, rather than limiting the implementation modes of the present invention. For those of ordinary skill in the art, changes or modifications in other different forms can also be made on the basis of the above description. It is not needed and it is impossible to list all implementation modes here. Any modifications, equivalent replacements and improvements made within the spirit and principles of the present invention shall be included within the protection scope of the claims of the present invention.

The invention claimed is:

1. A hierarchical decoupling, integrated and open communication open system, comprising a large communication network, a Yunxi platform, and a customer, which are communicatively connected to one another, wherein the Yunxi platform includes a service application layer, a communication capability layer and a resource pool, which are communicatively connected to one another, wherein the large communication network, the communication capability layer and the customer are communicatively connected to one another, and the service application layer is communicatively connected to the customer, wherein the communication capability layer includes a large network adaptation module, a call route analysis module, a call control module, a charging authentication control module, a data cache module, a data storage module, a large network implementing signaling processing module, a media processing module, and a customer connection signaling processing module, wherein the large network adaptation module is communicatively connected to the large network implementing signaling processing module, wherein the call route analysis module, the call control module, the charging authentication control module, the data cache module and the data storage module are communicatively connected to one another, wherein the large network implementing signaling processing module, the media processing module, and the customer connection signaling processing module are communicatively connected to one another, wherein the call route analysis module, the call control module, the charging authentication control module, the data cache module and the data storage module are each communicatively connected to the large network implementing signaling processing module, the media processing module and the customer connection signaling processing module, wherein the call route analysis module is configured to automatically put a call into a call queue for waiting, and then allocate an optimal call path to the call based on established call rules and call relations, wherein the call control module is configured to establish, maintain and clear a call, and complete an operation request from the service application layer by controlling the signaling processing module and the media processing module, wherein the charging authentication control module is configured for charging authentication of an access request from a user, determining a payment subscription status of the user, and authorizing a communication resource operation request, wherein the data cache and data storage module is configured for distributed data cache and data persistence under a microservice architecture, improving throughput of read operation to cope with high concurrent query requests, while ensuring the consistency of cache and database data, and wherein the media processing module is configured for voice acquisition, data packet transmission and reception, voice encoding and decoding, and jitter processing, and for responding to a control request from the signaling processing module, and decoupling signaling and a media service.

2. The hierarchical decoupling, integrated and open communication open system according to claim 1, wherein the service application layer includes functions of cloud recording, cloud transcription, cloud quality inspection, cloud business card, cloud positioning, cloud identification, cloud anti-disturb and/or number transfer.

3. The hierarchical decoupling, integrated and open communication open system according to claim 2, wherein the large communication network module comprises a fixed network IP multimedia subsystem, which is communicatively connected to an ISBC;

a fixed network NGN, which is communicatively connected to an ISBC;

a mobile network IP multimedia subsystem, which is communicatively connected to an AS cluster; and a mobile network CS, which is communicatively connected to a VMSC.

4. The hierarchical decoupling, integrated and open communication open system according to claim 3, wherein the resource pool includes an X86 cluster, an ARM cluster, a centralized storage, a distributed storage and/or an object storage.

5. The hierarchical decoupling, integrated and open communication open system according to claim 4, wherein the customer includes an application system communicatively connected to the service application layer and a call system communicatively connected to the customer connection signaling processing module.

6. The hierarchical decoupling, integrated and open communication open system according to claim 5, wherein the large network adaptation module includes the ISBC, the AS cluster and/or the VMSC, which are each communicatively connected to the large network implementing signaling processing module.

7. The hierarchical decoupling, integrated and open communication open system according to claim 6, wherein the large network implementing signaling processing module includes an implementing proxy and an implementing worker, the implementing proxy being communicatively connected to the implementing worker, and the ISBC, the AS cluster, and the VMSC are each communicatively connected to the implementing proxy.

8. The hierarchical decoupling, integrated and open communication open system according to claim 7, wherein the customer connection signaling processing module includes an access proxy and an access worker, the access proxy being communicatively connected to the call system or a switchboard.

9. The hierarchical decoupling, integrated and open communication open system according to claim 1, wherein the communication capability layer and the resource pool are communicatively connected to each other in a way that the resource pool is communicatively connected to the communication capability layer through resource cloudification, and the communication capability layer is stored in the resource pool through recording.

* * * * *